June 1, 1965 A. L. ASKEW, JR., ET AL 3,186,687
ROTARY PELLETIZING APPARATUS
Filed Sept. 3, 1963
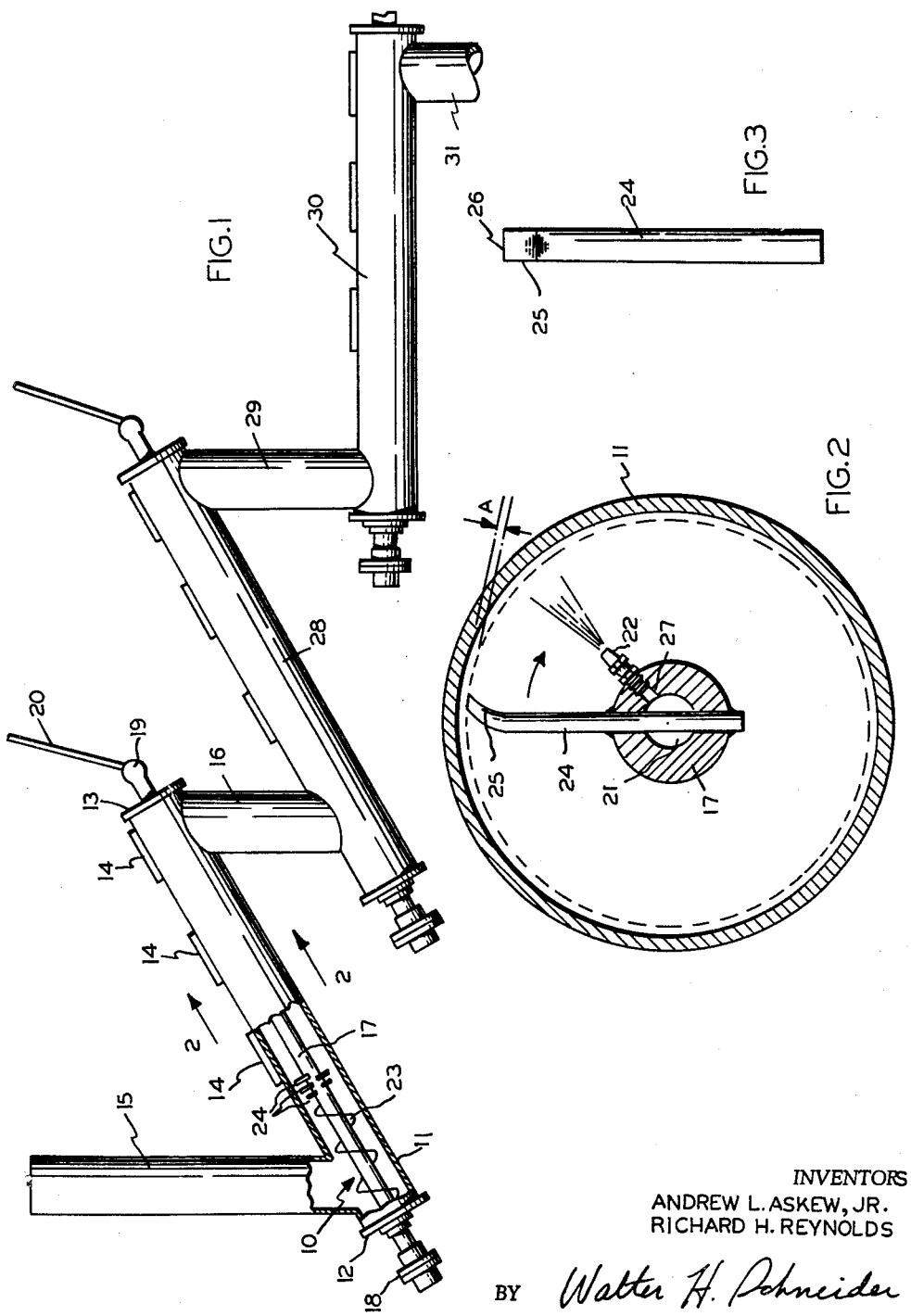
INVENTORS
ANDREW L. ASKEW, JR.
RICHARD H. REYNOLDS
BY *Walter H. Schneider*
THEIR ATTORNEY

United States Patent Office 3,186,687
Patented June 1, 1965

3,186,687
ROTARY PELLETIZING APPARATUS
Andrew L. Askew, Jr., Haifa, Israel, and Richard H. Reynolds, Aransas Pass, Tex., assignors to Ashland Oil & Refining Company, Houston, Tex., a corporation of Kentucky
Filed Sept. 3, 1963, Ser. No. 306,207
4 Claims. (Cl. 259—7)

This invention relates to the formation of pellets by causing numbers of individual particles of loose, finely divided material to adhere or cohere with one another by agitating the particles in the presence of a pelletizing fluid. The invention provides improvements in apparatus for forming pellets. An important aspect of our invention lies in its provision of an improved form of rotary pelletizing apparatus for carbon black.

Generally speaking, manufacturers of carbon black and other pellet-forming materials have widely adopted rotary pelletizing devices for their plant operations due to their relative simplicity and reasonably satisfactory performance. While there are many forms of rotary pelletizers varying in details of construction and arrangement of parts, most if not all such devices share a number of common characteristics. For instance, they are provided with one or more elongated pellet-forming chambers, each having an inlet for loose or partially pelletized material and an outlet for finished or partially developed pellets. A pellet-forming chamber is usually tubular in character, the inlet and outlet being disposed at the upstream and downstream ends thereof, respectively. Some system is provided for introducing a pelletizing fluid to the material prior to or during its treatment in the chamber. The pelletizing fluid may be water, water with any one of several known adjuvants, hydrocarbon oil or any other suitable material.

Another common feature, which is to be found within the chamber of the usual rotary pelletizer, is an "agitator means." By agitator means we refer to various parts, such as pins, arms, vanes, screws, cutters and scrapers, which carry out the function(s) of agitating a bed of pellets and pellet-forming material within the chamber and/or dislodging pellet-forming material caked on the interior surfaces of the chamber walls. The agitator means is disposed within the chamber on some movable or stationary support means. Commonly, rotary pelletizing apparatus also includes machinery for causing "relative rotary movement" between the agitator means and the chamber walls. By relative rotary movement is meant generally rotary movement of the agitator means or of the chamber walls, or various combinations of rotary and other modes of movement by the agitator means and/or chamber walls.

In a particularly well-known form of rotary pelletizing apparatus, the support means is a rotatable shaft disposed along the longitudinal axis of the chamber, the agitator means being a plurality of pins disposed at spaced points along the length of the shaft and extending outwardly therefrom towards the chamber walls and terminating at some point short of the walls. In this well-known type of apparatus, the chamber walls are held stationary and means are provided outside the chamber for rotating the shaft.

We have observed that certain shortcomings and problems inhere in presently available types of rotary pelleting apparatus. These include failure to quickly achieve relatively even distribution of the pelletizing fluid throughout the mass of material. Also, a layer of caked material tends to form on the walls of the pellet-forming chamber. When this layer is dislodged, as happens from time to time, undesirable large chunks thereof appear in the final product.

Also, there is the problem of the rapid attrition of the agitator means due to sustained frictional contact with the materials within the chamber, thus necessitating too frequent replacement. Thus, a demand remains for rotary pelletizing apparatus which does not exhibit the above problems and shortcomings.

It is a principal object of this invention to fulfill the above demand.

It is a further object of our invention to provide a wet pelleting system which includes means for continuously wetting down the pellet-forming materials in a rotary pellet mill just ahead of the agitator means as it passes therethrough, thus diminishing the friction between the material and agitator means.

Another object of this invention is to provide agitator means in the form of a pin which is ideally mounted and shaped for dislodging caked material from the interior walls of rotary pelletizing apparatus.

Still another object of our invention is the provision of rotary pelletizing apparatus in which the means for introducing the pelletizing fluid rotates continuously.

Other objects and advantages of the invention will readily suggest themselves to persons skilled in the art upon consideration of the accompanying drawings and the description which follows.

We have found that the above objects may be attained with certain improvements we have discovered. One such improvement lies in providing a rotary pelletizing device with means for introducing the pelletizing fluid in the form of a spray which precedes or remains ahead of the agitator means as it and the chamber walls rotate relative to one another. Preferably, the spray is directed substantially completely ahead of the agitator means. Another improvement lies in providing a rotary pelletizing mill with agitator pins having wedge-shaped outer extremities for facilitating the dislodgement of caked material from the chamber walls. Another improvement lies in providing a very small clearance between the ends of said pins and the walls of the pellet-forming chamber, so that formation of unduly thick cakes of material on the inner surfaces of said walls will be discouraged and the quantity of rejects will be reduced.

A preferred embodiment of our invention is disclosed below and in the accompanying drawings, in which like numerals refer to like parts in the several views and in which the sectional view is taken in the direction indicated by the section lines. In the drawing:

FIGURE 1 is a partially broken outside elevation of rotary pelletizing apparatus constructed in accordance with the invention.

FIGURE 2 is a sectional view taken along section line 2—2 in FIGURE 1.

FIGURE 3 is an enlarged front view of the device shown in FIGURE 2.

In the drawing, FIGURES 1 and 2 illustrate a rotary carbon black pelletizing device having a first pellet forming chamber 10, defined by fixed cylindrical walls 11 and by closure plates 12 and 13 attached to its upstream and downstream ends, respectively. The chamber is preferably inclined upwardly; that is, it rises towards its downstream end. However, upward inclination is not essential. There are access doors 14 at various points along walls 11. At the upstream end of the chamber is an inlet conduit 15, which is connected to any conventional means for feeding carbon-black thereto at a relatively uniform quantity rate. Such devices are well-known in the art and constitute no part of the invention. Consequently, they are not disclosed herein. The chamber outlet is a conduit 16 at the downstream end thereof.

A shaft 17, constituting an agitator support means, lies along the longitudinal axis of chamber 10, protrudes from each end thereof, and is journalled in suitable bearings (not shown) in plates 12 and 13. The shaft, which is free to rotate about its own longitudinal axis, may be connected to any suitable power means through a power transmission coupling 18 at its lower end.

Agitator means are arranged along shaft 17 inside chamber 10. Any conventional agitator means may be used. However, we prefer to place a conventional auger 23 at the downstream end of the shaft and a plurality of agitator pins 24 of special shape, along the remainder of the shaft. The shape and placement of these pins constitutes a feature of our invention.

The pins may have any desired cross-section, circular cross-section being preferred. They are secured to the shaft in a conventional manner, preferably in diametric holes provided in shaft 17, wherein they may be secured by tack welding. All, or preferably the outermost portion, of each pin is bent forward; that is, the outer end 25 thereof is directed towards the carbon black it passes through as the apparatus operates. Unlike conventional pins, which have pointed ends, these pins have wedge-like outer ends, which present sharp leading or cutting edges 26 of significant width, for instance ½". The pins may be fabricated of stainless steel, and are preferably coated, at least over the outer ends thereof, with a hard, friction-resistant material like "Colomony" or "Resistoly." The edges 26 are separated from the inner surfaces of walls 11 by a very small (no greater than about ½", preferably about 1/16") clearance "A" (see FIGURE 2). We have discovered that the weight percent of rejects (unacceptably large aggregates) produced by the apparatus is considerably less on account of this small clearance, the best results being obtained with the smaller dimension.

The manner of distribution of the pins 24 along shaft 17 is a matter of choice. We prefer to distribute the pins in a helical pattern in which each pin is separated from the neighboring pins on each side of it by a uniform longitudinal separation (about 1" to 2") and a uniform angular displacement (22½°) as suggested in FIGURE 1. It should be understood that for the sake of simplifying the drawing, only a few pins have been shown in FIGURE 1 and that in actual practice, the pins would be located all along shaft 17 from auger 23 to plate 13.

The shaft 17 is provided with a fluid transmission line extending along a portion of its length and traversing the major portion of the length of the pellet forming chamber. The exact form and location of the fluid transmission line with respect to the shaft may be varied considerably. However, we prefer, for the sake of convenience, to provide the fluid transmission line within the shaft. The shaft is hollow from a point just above coupling 18 to and including its top end, where a fluid transmission coupling 19 is located. This coupling forms fluid-tight connection with one end of fixed conduit 20, while allowing rotary movement therebetween. By connecting the other end of conduit 20 with a supply of pelletizing fluid (not shown), the fluid transmission line 21 is made to communicate with the source of pelletizing fluid.

In communication with the fluid transmission line, at spaced points along the agitator support means and inside the pellet-forming chamber, are a plurality of spray means. They occupy a fixed position with respect to the agitator means and are directed towards the chamber walls 11. Thus, when the agitator and agitator support means rotate, the spray means rotate with them.

We prefer to use spray means which have a relatively flat spray pattern and to place them so that the major axes of the spray patterns emanating therefrom are generally parallel to the longitudinal axis of the chamber 11. The particular number of spray means to be used is not critical; however, we believe that the paths of the sprays from adjacent spray means should over-lap or at least adjoin one another for best results.

We also prefer that the spray means should be oriented so that the impingement of the spray shall be concentrated ahead of the agitator means. By this we mean that the center of the spray should be directed so that it impinges on the agitated body of carbon black, pellets, and chips of caked carbon black which tend to be carried along in a turbulent, shifting mass in front of the agitator means. The pelletizing fluid is thus delivered where it is most needed, promoting more efficient mixing.

In the preferred form of our invention the spray of pelletizing fluid is directed outward from the shaft. By projecting the spray from the shaft, rather than from another location, such as from somewhere near the end of the pins or other agitator means, we are able to direct the pelletizing fluid not only upon the material at the tip of the agitator means, but also upon the material which is about to contact the agitator intermediate its periphery and the shaft.

The above preferences with regard to the placement and direction of the spray means are satisfied by the arrangement shown in FIGURE 2. "Ahead" of six selected, equally-spaced pins 24 on shaft 17 are ports 27, which are angularly displaced from the corresponding pin by 22½". The port communicates with fluid transmission line 21. Into the outer end of the port 27 is threaded a nozzle 22 having a relatively flat or oval spray pattern, the nozzle being turned to such a position in port 27 that the major axis of its spray pattern is at an angle of 22½° with the longitudinal axis of shaft 17. Thus, the sprays follow the pattern of the helically arranged pins. As indicated in the drawing, the nozzle 22 is well ahead of pin 24. However, the effect of the rotation of shaft 17 on the path of the spray is to bring it closer to the pin.

It would, of course, be possible to construct a unit of the above-described type that was long enough to carry out the complete operation of forming rough pellets. However, in the making of lengthy units, the maintaining of sufficiently accurate tolerances to insure that all the pins will have the desired small clearance without some of them actually scraping the chamber walls may prove difficult. Therefore, we prefer to use two or more short units instead of one long one, the units being arranged in series.

As shown in FIGURE 1, the presently preferred embodiment of our invention includes an eight-foot long first unit, which has already been described in detail, and a second unit 28. Pelletizing unit 28 is identical to the first unit in all respects, except that the auger may be, and preferably is, omitted and replaced by additional agitator pins. Outlet conduit 16 of the first unit is also the inlet conduit of the second unit. This conduit is made of sufficient diameter so that the entire output of the first unit may readily pass therethrough. This is also true of the outlet conduit 29 of unit 28.

Conduit 29 also constitutes the inlet of a polishing unit 30, which may be of any conventional type and size and does not, per se, constitute a feature of the invention. The outlet conduit 31 at the downstream end of polishing unit 30 is connected to any conventional means for drying the pellets. Such drying means are well-known in the art and are not part of our invention. Accordingly, they are not disclosed herein.

In the operation of the above-described system, loose carbon black or other pellet-forming feed is introduced into chamber 10 at a relatively uniform rate through inlet conduit 15 and is picked up by auger 23 which rotates clockwise, when viewed as in FIGURE 2. The auger urges the material upwards in the chamber towards the helically disposed, rotating pins 24, which pick up the carbon black particles and cause them to travel further up the inclined chamber towards outlet conduit 16. As the particles travel towards the outlet, they and practically the entire inner surface of the chamber walls are continually sprayed by the nozzles 22 on account of the rotation of the shaft. Each pass of a given nozzle over a given portion of the chamber and over the material therein is closely followed by the passage of the pins 24 which are mounted in that portion of the chamber. The combined action of the sprays and closely following mechanical agitation causes most or all of the loose carbon black particles to agglomerate into roughly spherical pellets.

In order to obtain the most satisfactory performance from the unit the carbon black input and the rate of rotation of shaft 17 are preferably set so that the portion of the chamber upstream of the auger is not choked with carbon black. Preferably, the volume of carbon black and pellets therein is kept small enough, so that when the nozzles are directed downward, the level of the material lies below them. This makes it possible for the nozzles to distribute the pelletizing fluid quite evenly and, as a consequence, leads to a rapid distribution of pelletizing fluid and relatively quick formation of pellets.

Any pelletizing fluid not taken up by the loose black and pellets being agitated by the pins 24 runs down the inclined walls of the chamber into the mass of black carried by the auger and is absorbed by it. All of the black introduced into the first unit eventually reaches the discharge outlet 16 in the form of roughly spherical pellets, small nuclei containing several particles each, and an occasional loose particle. The black then passes through outlet 16 into the upstream or input end of the second pellet-forming unit 28.

Throughout the length of unit 28, the above-described materials are subjected to the rotating spray and closely-following mechanical agitation. In the second unit, this treatment has the effect of polishing the pellets formed in the first unit. Some of the water in the interior of the pellets is brought to the surfaces thereof and the pellets become somewhat firmer. Also, any unagglomerated material and nuclei discharged from the first unit are formed into pellets. In this unit as in the first one, the volume of carbon black is preferably maintained low enough so that the level of material is below the nozzles when they are turned downward.

From unit 28 the pellets pass through outlet conduit 29 into polishing unit 30. This unit is operated so that it and perhaps even part of the conduit 29 are filled with pellets. The bed of pellets is gently agitated and any pellets which may require it are brought to a fully polished condition therein. The pellets move slowly through the unit 30 and drop out of the unit through outlet conduit 31 into a dryer wherein they are brought to a predetermined moisture content suitable for packaging, storage or use.

In the preferred mode of operation of the disclosed system, about half the total pelletizing fluid required is added in each of the two pellet-forming units. However, this apportionment of fluid between the units could be varied. The flow of pelletizing fluid into each unit should, of course, be held at a rate which is reasonably in proportion to the quantity rate at which carbon black is travelling through it. The ratio of the carbon black through-put of the system to the total pelletizing fluid input to both units should be held within operable pellet-forming ratios, which are well-known to those skilled in the art. The ratio control may be provided by automatically measuring the rate of black input to the first unit and controlling the flow of pelletizing fluid into the units in response thereto. The use of other suitable modes of automatic or manual control along with our novel rotary pelletizing apparatus would also fall within the scope of our invention. Also, the recycling of material from any of the units would not involve a departure from the spirit of our invention.

In the normal operation of prior art rotary pelletizing apparatus the problem of the formation of hard layers of caked material on the interior surface of the pellet-forming chamber has been sufficiently acute to stimulate efforts at finding ways of dislodging it while the apparatus is in operation. However, the dislodgement of the "cake" introduces large chunks of over-sized agglomerates or "rejects" into the pellets turned out by the apparatus. This, in turn, makes an extra process step necessary for the removal of the rejects, for these hard, over-sized agglomerates are definitely undesirable from the point of view of the purchasers of the pellets.

The present invention has turned this problem into an advantage. In our apparatus, there is a tendency for cake to start forming. However, the continuous spraying of virtually the entire inner surface of the pellet-forming chamber by our spray means and the immediate follow-up by the pins, whose cutting edges pass close to the chamber walls, dislodge the caked material in softened small pieces, many of which are readily broken down or built up during the agitation of the bed into well rounded, finished pellets of acceptable size. Thus, there are fewer rejects. Material which at one time had to be removed from the product and was then either wasted or reprocessed now appears in the product in the form of acceptable pellets. Also, the spraying of pelletizing fluid onto the material ahead of the agitator pins "lubricates" the pins, reducing wear and minimizing the chances of metal particles breaking off the pins and finding their way into the product.

In conclusion, while the foregoing specification and drawing describe the construction, operation and use of a preferred embodiment of the instant invention, it is to be understood that we do not intend to limit ourselves to the precise constructions and arrangements herein disclosed, since the various details of construction, form and arrangement may obviously be varied to a considerable extent by any person skilled in the art without really departing from the basic principles and novel teachings of this invention and without sacrificing any of the advantages thereof. Accordingly, the appended claims are intended to encompass all changes, variations, modifications and equivalents falling within the scope of our invention.

What we desire to protect by United States Letters Patent is:

1. Rotary pelletizing apparatus comprising: a stationary, upwardly inclined, cylindrical pellet-forming chamber closed off at each end by a closure plate; an inlet at one end of the chamber; an outlet at the other end of the chamber; a rotatable shaft carried by the closure plates and extending along the longitudinal axis of the chamber; an auger associated with a portion of the shaft inside the chamber adjacent the inlet; a plurality of agitator pins extending radially outward from the remainder of the shaft toward the walls of the chamber in a helical pattern, each of the pins being separated from each neighboring pin by a standard longitudinal spacing and angular displacement; the outer end of each pin being bent in the direction of its rotation and having a wedge-like peripheral portion which clears the aforesaid chamber wall by no more than about one-half inch; a plurality of ports formed in said shaft at spaced intervals ahead of said pins; nozzles secured in said ports and directed outward from said shaft toward said chamber walls; and a fluid transmission line within said shaft and communicating with said ports and said nozzles.

2. Rotary pelletizing apparatus according to claim 1 wherein the peripheral portion of each pin clears the chamber walks by about $\frac{1}{16}''$.

3. Rotary pelletizing apparatus according to claim 1 wherein said outlet is connected to the inlet of a second-pass unit which in all respects is identical to the apparatus described above, except that the auger is replaced by an additional number of said pins, said second-pass unit having an outlet communicating with a polishing unit.

4. Rotary pelletizing apparatus comprising: a cylindrical pellet-forming chamber having an inlet at one end and an outlet at the other end; a rotatable hollow shaft extending along the longitudinal axis of said chamber; a plurality of helically disposed agitator pins extending radially outwardly from said shaft toward the chamber wall; each pin being separated from each neighboring pin by a uniform longitudinal spacing and a uniform angular displacement; the outer end of each pin being bent in the direction of rotation and being formed with a forwardly facing cutting edge that is separated from the chamber wall by a very small clearance; and a plurality of spray means associated with the shaft for directing a pelletizing fluid outwardly toward the chamber wall; each spray means being uniformly angularly disposed ahead of a pin.

References Cited by the Examiner
UNITED STATES PATENTS

| | | | |
|---|---|---|---|
| 2,626,856 | 1/53 | Alles | 259—9 |
| 2,834,044 | 5/58 | Antonsen et al. | 18—1 |
| 3,049,750 | 8/62 | Austin | 259—6 X |

CHARLES A. WILLMUTH, *Primary Examiner.*